(12) United States Patent
Vamanan et al.

(10) Patent No.: US 11,696,121 B2
(45) Date of Patent: Jul. 4, 2023

(54) SECURITY FOR PAGING MESSAGES

(71) Applicant: APPLE INC., Cupertino, CA (US)

(72) Inventors: Sudeep M. Vamanan, Nuremberg (DE); Robert Zaus, Munich (DE); Birgit Breining, Munich (DE); Chen Ho Chin, Deerlijk (BE); Hyung-Nam Choi, Hamburg (DE)

(73) Assignee: Apple Inc., Cupertino, CA (US)

( * ) Notice: Subject to any disclaimer, the term of this patent is extended or adjusted under 35 U.S.C. 154(b) by 697 days.

(21) Appl. No.: 16/488,556

(22) PCT Filed: May 3, 2017

(86) PCT No.: PCT/US2017/030724
§ 371 (c)(1),
(2) Date: Aug. 23, 2019

(87) PCT Pub. No.: WO2018/182759
PCT Pub. Date: Oct. 4, 2018

(65) Prior Publication Data
US 2020/0015076 A1    Jan. 9, 2020

Related U.S. Application Data

(60) Provisional application No. 62/478,935, filed on Mar. 30, 2017.

(51) Int. Cl.
*H04W 12/02* (2009.01)
*H04W 76/27* (2018.01)
(Continued)

(52) U.S. Cl.
CPC ........... *H04W 12/02* (2013.01); *H04L 9/0891* (2013.01); *H04L 63/06* (2013.01); *H04W 12/72* (2021.01); *H04W 68/02* (2013.01); *H04W 76/27* (2018.02)

(58) Field of Classification Search
CPC ..... H04W 12/02; H04W 12/72; H04W 68/02; H04W 76/27; H04W 12/04; H04W 12/10; H04L 9/0891; H04L 63/068; H04L 1/0001
See application file for complete search history.

(56) References Cited

U.S. PATENT DOCUMENTS 5,889,861 A      3/1999 Ohashi et al.
9,590,962 B2 *   3/2017 Mizikovsky ........ H04L 63/0807
(Continued)

FOREIGN PATENT DOCUMENTS

WO     2013/172750 A1    11/2013
WO  WO-2016148357 A1 *   9/2016  ............ H04W 12/08
(Continued)

OTHER PUBLICATIONS

International Search Report and Written Opinion received for International Application No. PCT/US2017/030724, dated Sep. 12, 2017, 14 pages.
(Continued)

*Primary Examiner* — Duc C Ho
(74) *Attorney, Agent, or Firm* — Fay Kaplun & Marcin, LLP

(57) ABSTRACT

Briefly, in accordance with one or more embodiments, an apparatus of a user equipment (UE), comprises one or more baseband processors to derive a dynamic scrambling key, and a memory to store the dynamic scrambling key and a temporary UE identifier (temporary UE ID) assigned to the UE. The one or more baseband processors monitor a paging request for a scrambled UE identifier (UE ID) to determine if the paging request is intended for the UE by unscrambling the scrambled UE ID with the dynamic scrambling key to produce the temporary UE ID. The paging request is intended for the UE if the temporary UE ID produced by unscrambling the scrambled UE ID matches the temporary
(Continued)

UE ID stored in the memory. A new dynamic scrambling key may be derived each time the UE returns to a radio resource control idle (RRC_IDLE) state.

20 Claims, 9 Drawing Sheets

(51) Int. Cl.
*H04L 9/08* (2006.01)
*H04W 68/02* (2009.01)
*H04W 12/72* (2021.01)
*H04L 9/40* (2022.01)

(56) References Cited

U.S. PATENT DOCUMENTS

| | | | | |
|---|---|---|---|---|
| 2012/0042166 | A1* | 2/2012 | Gandhi | H04L 63/061 |
| | | | | 713/171 |
| 2013/0108047 | A1* | 5/2013 | Lu | H04W 12/02 |
| | | | | 380/270 |
| 2013/0310006 | A1* | 11/2013 | Chen | H04L 63/061 |
| | | | | 455/411 |
| 2015/0079941 | A1* | 3/2015 | Arkko | H04L 9/3226 |
| | | | | 455/411 |
| 2015/0124708 | A1* | 5/2015 | Blankenship | H04W 36/08 |
| | | | | 370/329 |
| 2016/0295398 | A1* | 10/2016 | Ketheesan | H04W 12/04 |
| 2017/0012947 | A1* | 1/2017 | Lee | H04W 76/10 |
| 2017/0280354 | A1* | 9/2017 | Huang | H04L 27/2603 |

FOREIGN PATENT DOCUMENTS

WO  WO-2018031345 A1 * 2/2018
WO  2018/182759 A1  10/2018

OTHER PUBLICATIONS

Intel, "pCR to TR 33.899; Securing and Refreshing the Temporary Subscriber Identifiers," document for approval, Mar. 26-31, 2017, 4 pages, S3-170632, 3GPP TSG SA WG3 (Security) Meeting #86-Adhoc, Busan, KR.

* cited by examiner

SECURITY FOR PAGING MESSAGES

CROSS-REFERENCE TO RELATED APPLICATIONS

The present application is the National Stage application for International Application No. PCT/US2017/030724 filed Mar. 5, 2017, entitled SECURITY FOR PAGING MESSAGES, which in turn claims the benefit of U.S. Provisional Application No. 62/478,935 filed Mar. 30, 2017. Said Application No. PCT/US2017/030724 and said application No. 62/478,935 are hereby incorporated herein by reference their entireties.

BACKGROUND

Research has shown that the coarse location of a user equipment (UE) may be obtained by careful use of the paging mechanism in of the Long Term Evolution (LTE) standards published by the Third Generation Partnership Project (3GPP). The System Architecture Evolution (SAE) Temporary Mobile Subscriber Identity (S-TMSI) of a UE that is used for paging is not changed often, thereby making it easier for a hacker to repeatedly page the UE and track its location either at cell level, for example if smart paging is used, or at the tracking area level.

The consequences from a location leak of a UE via paging is manifold. First, the user's privacy may be impacted, since a basic consequence of a location leak is that an attacker is able to track the movement of the user. Second, a targeted denial of service attack may be possible, since with the knowledge of victim's Globally Unique Temporary Identifier (GUTI), the attacker can setup a fake evolved Node B (eNB) and keep a compromised UE attached to the fake eNB, for example by accepting a tracking area update (TAU) just from this UE and rejecting all others. Although the problem of location leaks through paging was demonstrated to exist in LTE networks, the issue of sending a UE identity (UE ID) in clear text in paging messages is also present in Second Generation (2G) networks and Universal Mobile Telecommunications Service (UMTS) networks, and most likely may exist in Fifth Generation (5G) networks.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
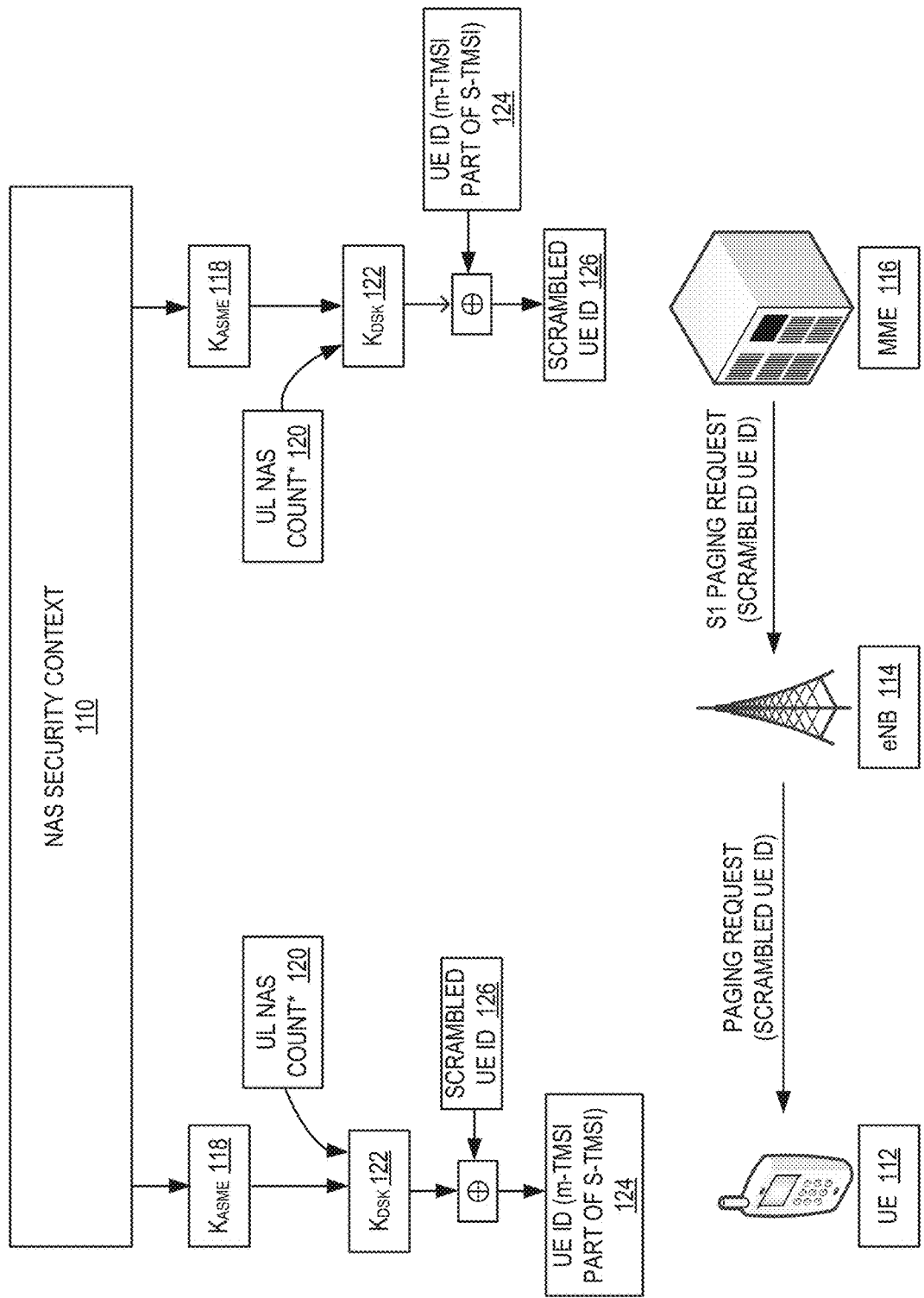
FIG. 1 is a block diagram of initiation of secure paging in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a block diagram of initiation of secure paging in accordance with one or more embodiments will be discussed. FIG. 1 shows the overall functionality of secure paging as discussed herein. In one or more embodiments, FIG. 1 illustrates enhancements to one or more technical standards promulgated by the Third Generation Partnership Project (3GPP) such as Technical Standard (TS) 33.899 directed to securing and refreshing the temporary subscriber identifiers for next generation systems, although the scope of the claimed subject matter is not limited in this respect. A non-access stratum (NAS) security context 110 may be established between a user equipment (UE) and a mobility management entity (MME) 116 in communication via evolved Node B (eNB) 114. Security for paging may be initiated as soon as a NAS security context 110 is established, typically during the initial registration (ATTACH) procedure. Such an initial registration procedure results in the assignment of a key, Key Access Security Management Entity (KASME) 118, to UE 112 and MME 116. The value of uplink (UL) NAS COUNT 120 used by UE 112 for sending a Security Mode Complete message is used to generate the first Key Dynamic Scrambling Key (KDSK) 122 which is used for the scrambling of UE identity (UE ID) 124 used in paging. In one or more embodiments, a NAS COUNT may refer to a count or number of messages sent that are ordinally numbered with a 32-bit number. The NAS COUNT may comprise a portion of the 32-bit number, for example the eight least significant bits (LSBs) of the 32-bit NAS COUNT number, although the scope of the claimed subject matter is not limited in this respect. The NAS COUNT value may be incremented for each NAS message sent to the network, and thus each time a new connection is established between UE and network. Since the value of the NAS COUNT will be changed, a new key value may be derived each time a new connection is established. In some embodiments, a new key may not be derived for each NAS message sent to the network. During the lifetime of a connection, UE 112 could send more than one NAS message, and if the last NAS message sent is not received by the network, UE 112 and MME 116 could get out of sync regarding the NAS COUNT and the KDSK derived from it. Generally, during the lifetime of a connection it is necessary only once to derive a new KDSK, and to use for this a NAS message where UE 112 safely may assume that the message was received by MME 116. It should be noted that, as discussed in further detail with respect to FIG. 5 below, when a connection is handed over to a new MME, the new MME performs a new authentication and key agreement and security mode activation, and then actually a second new KDSK will be derived. For the next paging procedure, MME 116 performs an exclusive OR operation (X-OR) of KDSK 112 with the UE ID 124 comprising a System Architecture Evolution (SAE) Temporary Mobile Subscriber Identity (S-TMSI) to generate the scrambled UE ID 126. The scrambled UE ID 126 is sent in the air interface message via eNB 114 to UE 112. At the UE 112 side, the reverse operation with KDSK 122 and the scrambled UE ID 126 may yield the UE ID (S-TMSI) 124.

Using the thus described NAS security context 110, two aspects of paging security may be implemented either independently or in combination as follows. A first aspect of paging security involves ID abstraction through scrambling. The UE ID 124 used for paging for example in accordance with a Long Term Evolution (LTE) standard of the Third Generation Partnership Project (3GPP), LTE, may comprise the S-TMSI, wherein octet 2 to 5 of the S-TMSI, referred to as an MME TMSI (M-TMSI), is X-ORed with a 32-bit dynamic scrambling key, KDSK 122, derived from KASME 118. The UE ID 124 is scrambled ensuring that the scrambled UE ID 126 changes every time there is a Security Authentication and Key Agreement (AKA) procedure resulting in a new KASME 118, even if the S-TMSI is not changed. In a variation of this first aspect, the full S-TMSI, that is octets 1 to 5 of the S-TMSI 124, is X-ORed with a 40-bit dynamic scrambling key, KDSK', derived from KASME 118.

A second aspect of paging security involves dynamic changing of UE ID 124. The scrambling key KDSK 122 is modified every time UE 112 goes to a radio resource control idle mode (RRC_IDLE). The parameters (UL NAS COUNT 120 and KASME 118) used to derive the scrambling key are maintained independently by UE 112 and MME 116. The KASME 118 is never transmitted via the radio interface between eNB 114 and UE 112, thus KASME 118 is protected against eavesdroppers, and the next value for KDSK 118 cannot be predicted by a hacker. It is also possible to include additional parameters in the derivation of the KDSK 122, for example the Cell Identity (Cell ID) of the cell where UE 112 sent the NAS message including the UL NAS COUNT 120 to increase the protection of the key KASME 118 against security attacks. The key derivation function f (UL NAS COUNT 120, KASME 118, Cell ID) used to derive KDSK 118 should be chosen so that it is not easily possible to reconstruct KASME 118, even if an attacker is otherwise able to determine UL NAS COUNT 129 and Cell ID. An example of the key hierarchy for secure paging is shown in and described with respect to FIG. 2, below.

Figure 2:
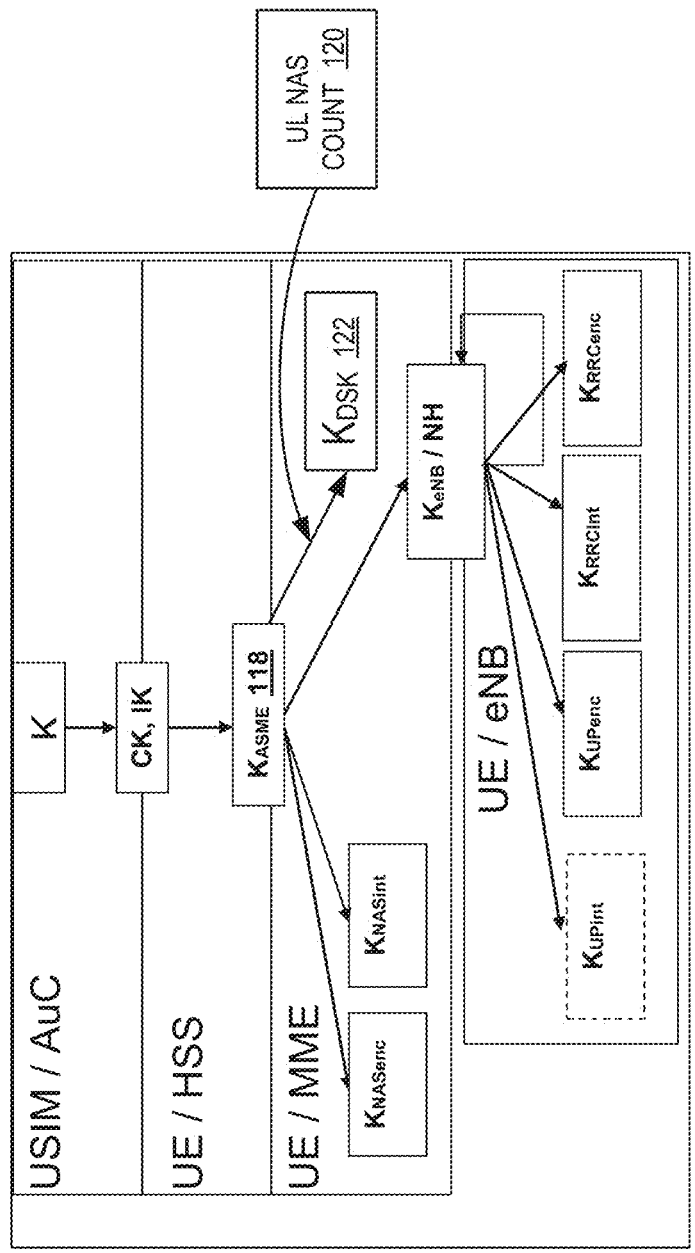
FIG. 2 is a block diagram of a key hierarchy for secure paging in accordance with one or more embodiments.

Referring now to FIG. 2, a block diagram of a key hierarchy for secure paging in accordance with one or more embodiments will be discussed. FIG. 2 is a pictorial representation of where the key resides in the existing Evolved Packet System (EPS) key hierarchy 200. EPS key hierarchy includes KASME 118 and KDSK 122 as shown. UL NAS COUNT 120 is used to derive KDSK 122 from KASME 118. Interaction diagrams using the keys shown in FIG. 2 are described with respect to FIG. 3 through FIG. 5, below.

Figure 3:
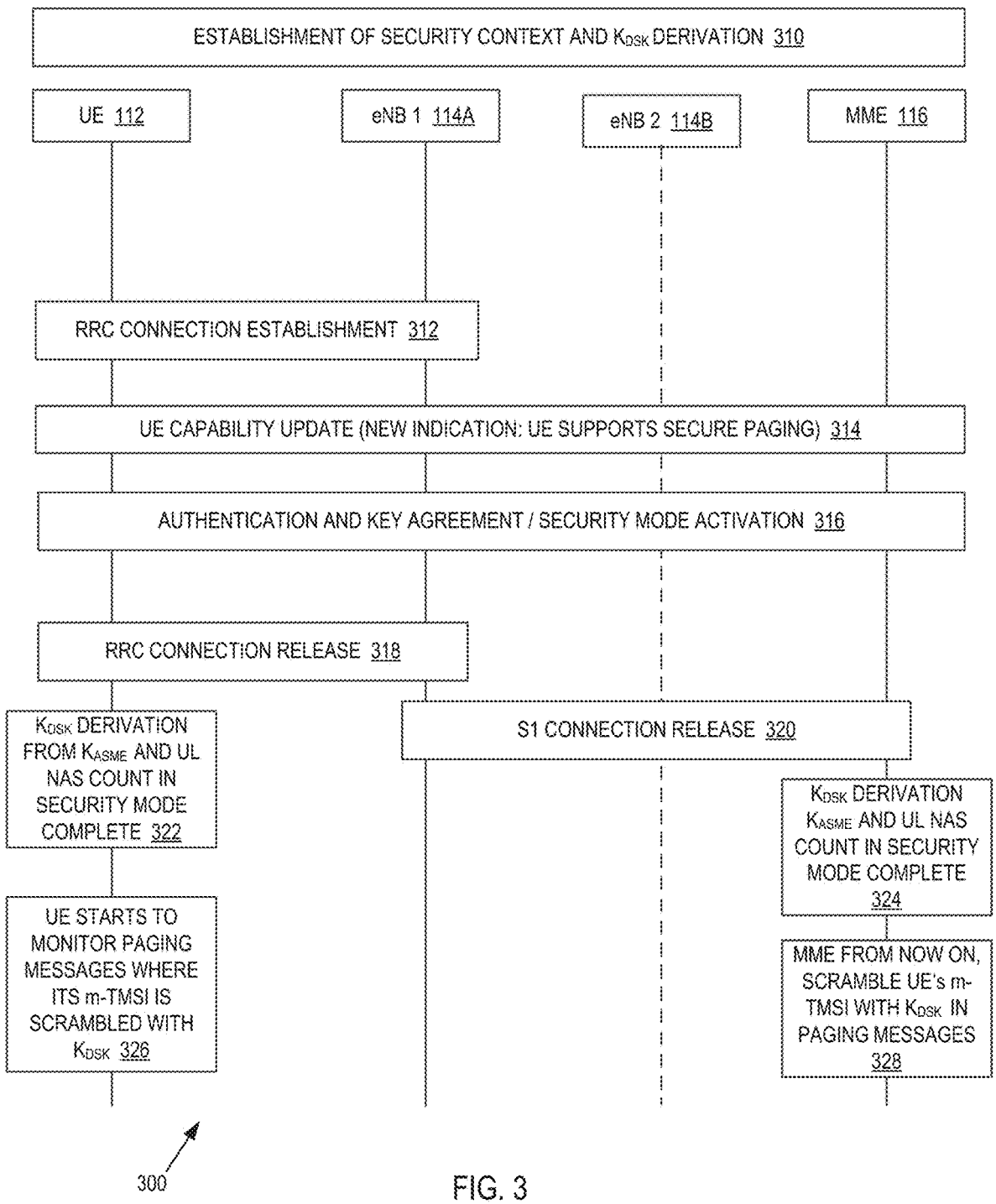
FIG. 3 is a flow diagram of establishment of a security context and key derivation for secure paging in accordance with one or more embodiments.

Referring now to FIG. 3, a flow diagram of establishment of a security context and key derivation for secure paging in accordance with one or more embodiments will be discussed. The flow diagram 300 of FIG. 3 shows the initial establishment of security context and generation of the KDSK 310 used for generation of the scrambled UE ID 126 as follows. At block 312, a radio resource control (RCC) connection is established. At block 314, new field in the UE 112 capability information element (IE) indicates whether UE 112 supports the secure paging procedure. At block 316, an authentication and key agreement (AKA) procedure may be performed and a security mode may be activated. It should be noted that security mode activation is independent of indication by UE 112 of secure paging support. During the AKA and security mode procedure, both UE 112 and MME 116 derive a new KASME and take the new KASME into use. If the UE capability information element at block 314 indicates support for secure paging and provided that the network performs a security mode control procedure at block 316, UE 112 and MME 116 determine the UL NAS COUNT 120 to be used to derive the scrambling key for paging KDSK 122 as the UL NAS COUNT 120 used for sending Security Mode Complete message to network. The derivation may occur at block 322 and block 324 depending on whether UE 112 has indicated support for secure paging. If the MME does not perform security mode activation at block 316 and therefore the UE does not send a Security Mode Complete message, then UE 112 and MME 116 determine the UL NAS COUNT 120 to be used to derive the scrambling key for paging KDSK 122 as the UL NAS COUNT 120 of the first NAS message sent at block 312 during RRC connection establishment. At block 318 an RRC connection release may be performed, and at block 320 an S1 connection release may be performed in which case UE 112 goes back to an idle mode (RRC_IDLE). If the UE capability information element at block 314 indicates support for secure paging, key derivation of the scrambling key for paging KDSK 122 as a function of KASME 118 and UL NAS COUNT 120 is performed for the UE 112 at block 322 and for the MME 116 at block 324.

After UE 112 goes back to RRC_IDLE, at block 326 UE 112 begins to monitor paging messages addressed by its UE ID (S-TMSI) 124 X-ORed with KDSK 122. MME 116 performs the same X-OR operation at block 328 to derive the scrambled UE ID 126 for subsequent paging. The S-TMSI or the m-TMSI part of the S-TMSI is scrambled with this dynamic scrambling key for subsequent paging. It should be noted that in the message flow of flow diagram 300 of FIG. 3, UE 112 may send a secure paging support indication to MME 116 at block 314, but there is no corresponding support indication shown for the direction from MME 116 to UE 116. This unidirectional secure paging support indication may be handled in at least two embodiments.

In a first embodiment, MME 116 indicates in a new field, for example in the Network feature support IE in Attach Accept and tracking area update (TAU) Accept, that MME 116 supports secure paging. As a result, UE 112 knows whether MME 116 supports secure paging and whether accordingly UE 112 needs to monitor paging messages for the scrambled UE ID 126 or for the unscrambled UE ID (S-TMSI) 124.

In a second embodiment, there is no indication provided from MME 116 to UE 112. In such an arrangement, as UE 112 does not know whether MME 116 supports secure paging, UE 112 monitors paging messages both for the scrambled UE ID 126 and for the unscrambled UE ID (S-TMSI) 124. UE should perform this dual ID monitoring at least for the first paging in a new tracking area. Once UE 112 has received a paging with a scrambled UE ID 126, and the paging response was accepted by MME 116 by delivering a mobile terminated (MT) transaction such as downlink (DL) signaling or a DL user data packet, UE 112 then may assume that MME 116 supports secure paging. As a result, UE 112 no longer needs to monitor paging messages for the unscrambled UE ID 124.

Figure 4:
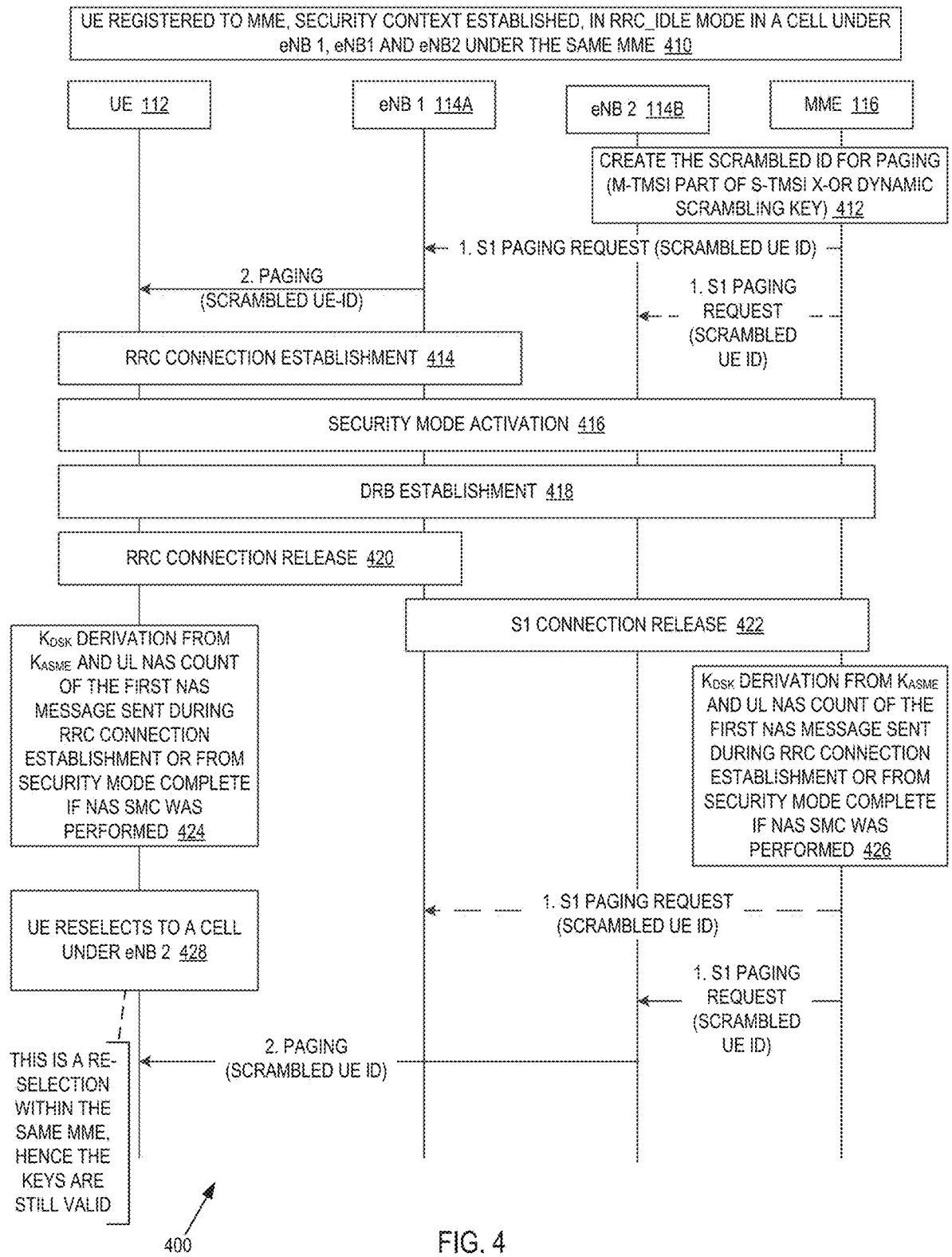
FIG. 4 is a flow diagram of receiving a secure paging after reselection from one evolved Node B (eNB) to another eNB operating under the same mobility management entity (MME) in accordance with one or more embodiments.

Referring now to FIG. 4, a flow diagram of receiving a secure paging after reselection from one evolved Node B (eNB) to another eNB operating under the same mobility management entity (MME) in accordance with one or more embodiments will be discussed. Flow diagram 400 shows how the paging procedure is performed using the scrambled UE ID 126 obtained by performing an X-OR operation of the UE ID (S-TMSI) 124 with the KDSK 122. At block 412, the scrambled UE ID 126 is created for paging using the M-TMSI part of the S-TMSI X-ORed with a dynamic scrambling key. Next, MME 116 provides the scrambled UE ID 126 to all the evolved Node Bs, for example a first eNB (eNB 1) 114A and a second eNB (eNB 2) 114B where UE 112 is to be paged.

Due to the received paging, for example for a mobile terminated call, an RRC connection is established at block 414 between UE 112 and first eNB 114A. The security mode may be activated at block 416, and a dedicated radio bearer (DRB) may be established at block 418. After the call, the RRC connection is released at block 420. The UE 112 and MME 116 compute a new value for KDSK 122 at block 424 and at block 426, respectively, based on the UL NAS COUNT 120 used for sending the SECURITY MODE COMPLETE if a NAS Security Mode Control Procedure was performed at block 416. If the NAS Security Mode Control Procedure was not performed, but secure exchange of NAS messages was successfully established between UE 112 and MME 116, UE 112 and MME 116 use the UL NAS COUNT 120 of the initial NAS message sent in the uplink (UL) during the RRC connection establishment at block 414 or during an RRC connection resume if Cellular Internet of Things (CIoT) User Plane (UP) optimization is used. The KDSK 122 is used by MME 116 for preparing the scrambled UE ID 126 for the next S1 Paging Request.

In the message flow of flow diagram 400, the UE 112 further reselects to another E-UTRAN cell at block 428 under second eNB 114B which is connected to the same MME 116 to which the first eNB 114A is connected. If the tracking area has not changed due to the cell change, there is no additional registration update needed towards the network, and the MME 116 and UE 112 continue to use the latest value of KDSK 122 for scrambling the UE ID 124 in the paging message. Since the cell reselection at block 428 is a reselection within the same MME 116, the keys used with the first eNB 114A are still valid for the second eNB 114B.

Figure 5:
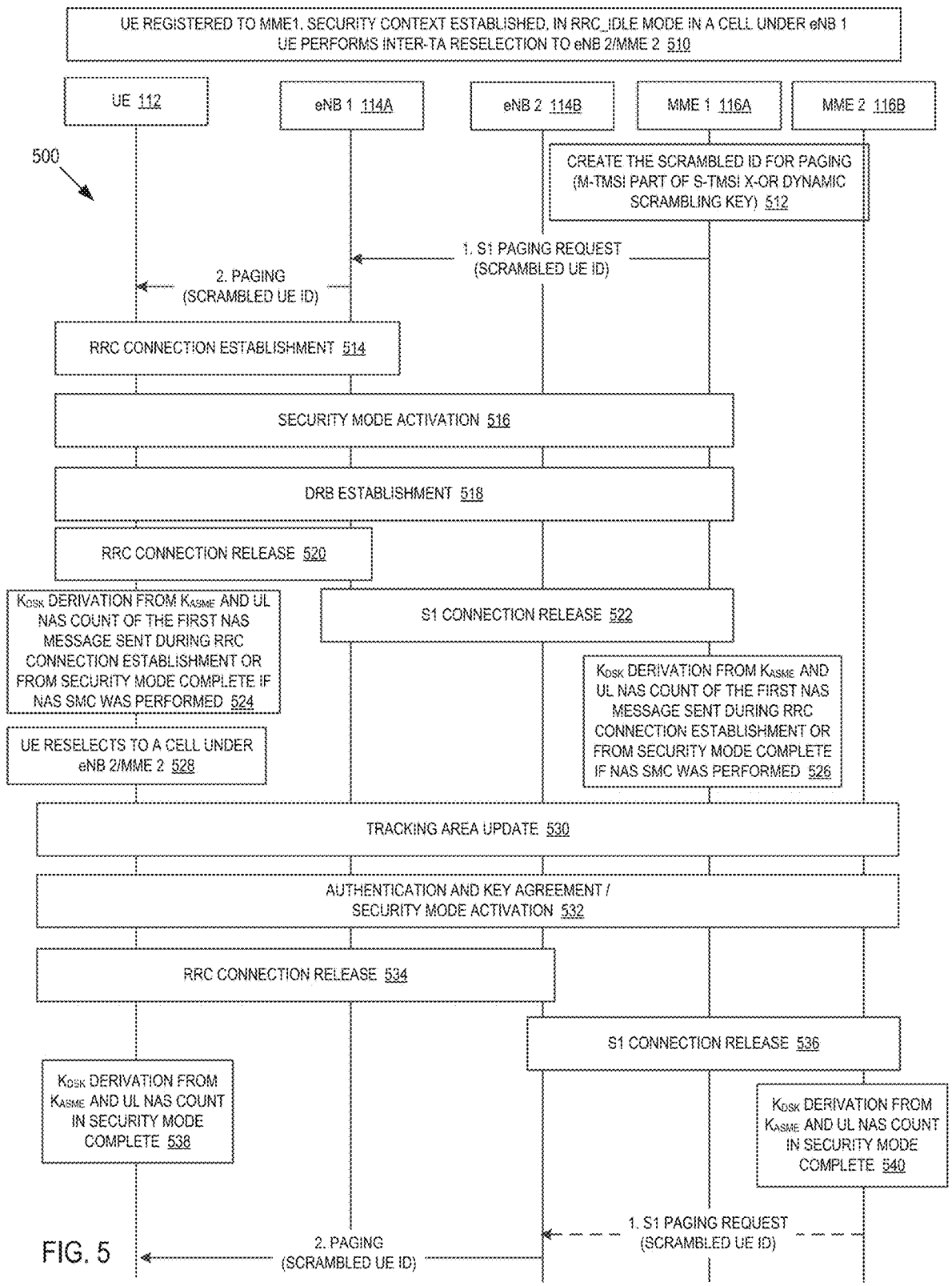
FIG. 5 is a flow diagram of receiving a secure paging subsequent to a inter-tracking area (inter-TA) reselection from one eNB operating under a first MME to another eNB operating under a second MME in accordance with one or more embodiments.

Referring now to FIG. 5, a flow diagram of receiving a secure paging after inter-tracking area (inter-TA) reselection from one eNB operating under a first MME to another eNB operating under a second MME in accordance with one or more embodiments will be discussed. Flow diagram 500 shows the case 510 of a reselection to another tracking area wherein UE 112 registered to a first MME (MME 1) 116A establishes a security context with the first MME 116A. Then while in an RRC-IDLE mode in a cell under first eNB (eNB 1) 114A, UE 112 performs an inter tracking area (inter-TA) reselection to a second eNB (eNB 2) 114B and second MME (MME 2) 116B. In the message flow, UE 112 initially is located in a cell served by first eNB 114A and first MME 114A where it is paged, for example for a mobile terminated call. After the call is released, UE 112 and first MME 116A compute new KDSK 122 values. In a manner similar to flow diagram 400 of FIG. 4, at block 512, the scrambled UE ID 126 is created for paging using the M-TMSI part of the S-TMSI X-ORed with a dynamic scrambling key. Next, MME 116A provides the scrambled UE ID 126 to all the evolved Node Bs, for example a first eNB 114A and a second eNB 114B where UE 112 is to be paged.

Due to the received paging, for example for a mobile terminated call, an RRC connection is established at block 514 between UE 112 and first eNB 114A. The security mode may be activated at block 516, and a dedicated radio bearer (DRB) may be established at block 518. After the call, the RRC connection is released at block 520 and the S1 connection is released at block 522. The UE 112 and MME 116 compute a new value for KDSK 122 at block 524 and at block 526, respectively, based on the UL NAS COUNT 120 used for sending the SECURITY MODE COMPLETE if a NAS Security Mode Control Procedure was performed at block 516. If the NAS Security Mode Control Procedure was not performed, but secure exchange of NAS messages was successfully established between UE 112 and MME 116, UE 112 and MME 116 use the UL NAS COUNT 120 of the initial NAS message sent in the uplink (UL) during the RRC connection establishment at block 514 or during an RRC connection resume if Cellular Internet of Things (CIoT) UL optimization is used. The KDSK 122 is used by MME 116 for preparing the scrambled UE ID 126 for the next S1 Paging Request.

Subsequently, UE 112 performs reselection at block 528 to a cell under second eNB 116B and second MME 116B belonging to a different tracking area. UE 112 performs a tracking area update (TAU) at block 530 to be registered with the new second MME 116B. During the TAU procedure at block 532, the new MME, second MME 116B, will retrieve the existing NAS security context from the old MME, first MME 116A. Additionally, second MME 116B may establish a new NAS security context by performing an authentication procedure and a NAS security mode control procedure. If a new NAS security context is established, then a new KDSK 122 value has to be derived at block 538 and at block 540 based on the KASME 118 of the new security context established between UE 112 and new MME, second MME 116B, and based on the UL NAS COUNT 120 used for sending the SECURITY MODE COMPLETE message.

If the new MME, second MME 116B, decides to continue using the existing NAS security context, and the NAS Security Mode Control Procedure is not performed, but secure exchange of NAS messages is successfully established between UE 112 and second MME 116B, UE 112 and second MME 116B use the UL NAS COUNT 120 of the TAU Request message, which is equal to the initial NAS message, sent in the UL during the RRC connection establishment. Second MME 116B receives the value of UL NAS COUNT 120 of the last NAS message received by the old MME from the old MME, first MME 116A, during the inter-MME TAU procedure when the old MME, first MME 116A, provides the EPS security context to second MME 116B as part of the mobility management (MM) Context parameter in the General Packet Radio Service (GPRS) Tunneling Protocol (GTP) message Context Response. Thus, the second MME 116B may establish secure exchange of NAS messages between UE 112 and second MME 116B without performing a new authentication and key agreement (AKA) and security mode control procedure at block 532. After completion of the TAU procedure an RRC connection release may be performed at block 534 and an S1 connection release may be performed at block 536 to put UE into an idle mode RRC_IDLE. UE 112 may derive a new KDSK 112 at block 528 to obtain the UE ID 124 from the scrambled UE ID 126 received from the second MME 116B via second eNB 114B where second MME 116B derived a new KDSK 122 at block 540.

In one or more embodiments, various abnormal scenarios may be addressed. For loss of synchronization between UE 112 and MME 116, a Radio Link Failure (RLF) during transmission of the SECURITY MODE COMPLETE message or the DL NAS message starting the secure exchange of NAS messages may occur. There may be two different possible scenarios. In a first scenario, if the SECURITY MODE COMPLETE is not received by the MME 116 due to a radio link failure, the UE 112 would derive a new KDSK 122 based on the UL NAS COUNT 120 used for sending that message, whereas the MME 116 would stick to the existing KDSK 122. In a second scenario, if the DL NAS message is not received by the UE 112 due to a radio link failure, the MME 116 would derive a new KDSK 122 based on the UL NAS COUNT 120 used by the UE for sending the initial NAS message, whereas the UE 112 would stick to the existing KDSK 122.

In a first embodiment where the UE 112 knows that the network supports secure paging, a possible solution for the first scenario, above, is the following. If the UE 112 sends SECURITY MODE COMPLETE and a radio link failure occurs or the RRC connection is released before the MME 116 sends a DL NAS message security protected with the new EPS security context, then the UE 112 monitors for paging messages both with the old and with the new scrambled UE ID 126. The UE 112 does this until any of the following conditions is fulfilled: the UE 112 successfully responds to a paging with one of the two scrambled UE IDs 126, or a new KDSK 122 is generated during a subsequent mobile originated access.

In the first embodiment, a possible solution for the second scenario is the following. If the MME 116 is informed by the eNB 114 about a RLF after the MME 116 sent the DL NAS message starting the secure exchange of NAS messages, but before the MME 116 received an encrypted UL NAS message from the UE 112, then for the next paging operations the MME 116 uses both the old and the new UE ID 124. The MME 116 does this until any of the following conditions is fulfilled: the UE successfully responds to a paging with one of the two scrambled UE IDs 126, or a new KDSK 122 is generated during a subsequent mobile originated access.

If the embodiment described with respect to FIG. 4 is utilized, that is the network does not signal that it supports secure paging, then a possible solution for the first scenario, above, is the following. If a radio link failure occurs when the MME 116 is waiting for receipt of a SECURITY MODE COMPLETE message, then the MME 116 uses both the old scrambled UE ID 126 and the unscrambled S-TMSI for paging. Paging with the two identities may be done sequentially, for example the MME 116 could first page with the scrambled UE ID 126, and if the UE 112 does not respond the MME 116 sends a second paging using the unscrambled S-TMSI. The MME 116 does this until any of the following conditions is fulfilled: the UE 112 successfully responds to a paging with the old scrambled UE ID 126, or a new KDSK 122 is generated during a subsequent mobile originated access.

A possible solution for the second scenario, above, may be the following. If the MME 116 is informed by the eNB 114 about an RLF after the MME 116 sent the DL NAS message starting the secure exchange of NAS messages, but before the MME 116 received an encrypted UL NAS message from the UE 112, then the MME 116 uses both the new scrambled UE ID 126 and the unscrambled S-TMSI for paging. Paging with the two identities may be done sequentially, as described for the first scenario, above. The MME 116 does this until any of the following conditions is fulfilled: the UE 112 successfully responds to a paging with the new scrambled UE ID 126, or a new KDSK 118 is generated during a subsequent mobile originated access.

Other considerations likewise may be addressed in one or more additional embodiments. In one embodiment, a Globally Unique Temporary Identifier (GUTI) is a globally unique identifier. When the S-TMSI part of GUTI is scrambled using the above procedure, uniqueness may be lost which may lead to a UE 112 responding to a paging request that is not intended for it. This may be resolved, however, at the next operation, when the MME 116 receives the GUTI included in the uplink NAS message from the UE 112 and checks whether it has a Mobile Terminated (MT) transaction for the UE 112.

In another embodiment, the GUTI may be included in an unencrypted message in uplink. The first NAS message that carries the GUTI is sent unencrypted as part of an RRC Connection Setup Complete message. To prevent the situation of hacker accessing the GUTI from an uplink transmission, the GUTI may be encrypted with another scrambling key derived from KDSK 122. This uplink scrambling key may be derived, for example based on a key derivation function from KDSK 122 and the NAS Cell ID of the cell where UE 112 performs uplink transmission. It is noted that the risk of a hacker accessing S-TMSI from this uplink transmission is seen as low, since it involves identifying the cell on which UE 112 performs Random Access and eavesdropping on all downlink channel resources relevant for the RRC Connection Setup and filtering out uplink resources relevant to this UE 112.

In one particular embodiment, the encrypted S-TMSI may be included in the GUTI in the uplink NAS message, and the MME 116 uses the integrity protection included by each UE 112 in the NAS message to decide which sender is the correct sender. That is, if the MME 116 receives two or more paging response messages including different message authentication codes (MACs) in response to a paging with a scrambled S-TMSI, the MME 116 uses the NAS security context 110 of the UE 112 which was targeted with the paging message to verify for which of these messages the message authentication code (MAC) of the message is correct. If the MAC is not correct, the MME 116 just releases the RRC Connection for the UE 112 which has wrongly responded to the paging. For the wrong UE 112, the RRC connection may be terminated much before a stage where the user is notified. In another particular embodiment, the paging collision may be resolved when the MME 116 performs the descrambling of the encrypted GUTI. The descrambling may be performed using the derived key from the KDSK 122 of the UE 112 which was targeted with the paging message. This step may fail for the UE 112 which erroneously responded to the paging, and the MME 116 may release the connection for this UE 112 at this stage. This particular embodiment may also be applied in addition to the verification of the MAC to resolve cases in which more than one UE 112 is including the same MAC in the paging response message.

In another embodiment, if UE 112 and the network are using the RRC Connection suspend state, that is if Cellular Internet of Things (CIoT) user plane optimization is used, a temporary dynamic scrambling key, KDSK* may be derived from KDSK 122, and the RRC Connection Resume ID and may be used for scrambling the UE ID 124. In yet another embodiment, for Access Network initiated paging, for example when the UE is in a "lightly connected" state, the UE 112 may listen to a paging message including an S-TMSI scrambled with a key derived from the key eNB (KeNB). For example, considering a "light connection" state of a Long Term Evolution (LTE) standard of the Third Generation Partnership Project (3GPP), it may be assumed that the Evolved Packet System (EPS) bearers via an S1-U connection may be established, and the eNB 114 and the UE 112 have a KeNB from the previous EMM-Connected mode. During the change from "light connection" to the Evolved Packet System (EPS) Mobility Management Connected (EMM-Connected) mode, however, the UE 112 will not necessarily transmit an initial NAS message or any NAS message at all if UE 112 just has UL data to send, that is UE 112 will not transmit a new UL NAS COUNT which may be used to derive a new scrambling key for each network access. It is possible, however, that UE 112 and eNB 114 derive a chain of scrambling keys from KeNB, similar to how this may be done today with the next hop (NH) parameter in security stage 2 as published in 3GPP Technical Standard (TS) 33.401, for example, a first Next Hop Scrambling Key (NHscr) may be be derived in the MME from KASME 118 and KDSK 122 and provided to eNB 114 as part of initial Context Setup. A similar derivation may be performed at the UE 112 side. The eNB 114 and UE 112 then use the current NHscr and KeNB to generate the next NHscr every time the UE 112 goes to Lightly Connected state after the security context is established. The eNB 114 and UE 112 use the NHscr and possibly additional input parameters, for example the Evolved Absolute Radio Frequency Channel Number (EARFCN) downlink (DL) of the serving cell where the UE 112 was last time in the RRC Connected state, to generate an eNodeB Dynamic Scrambling key (Kedsk) used for scrambling of the S-TMSI for the case of Access Network initiated paging.

Figure 6:
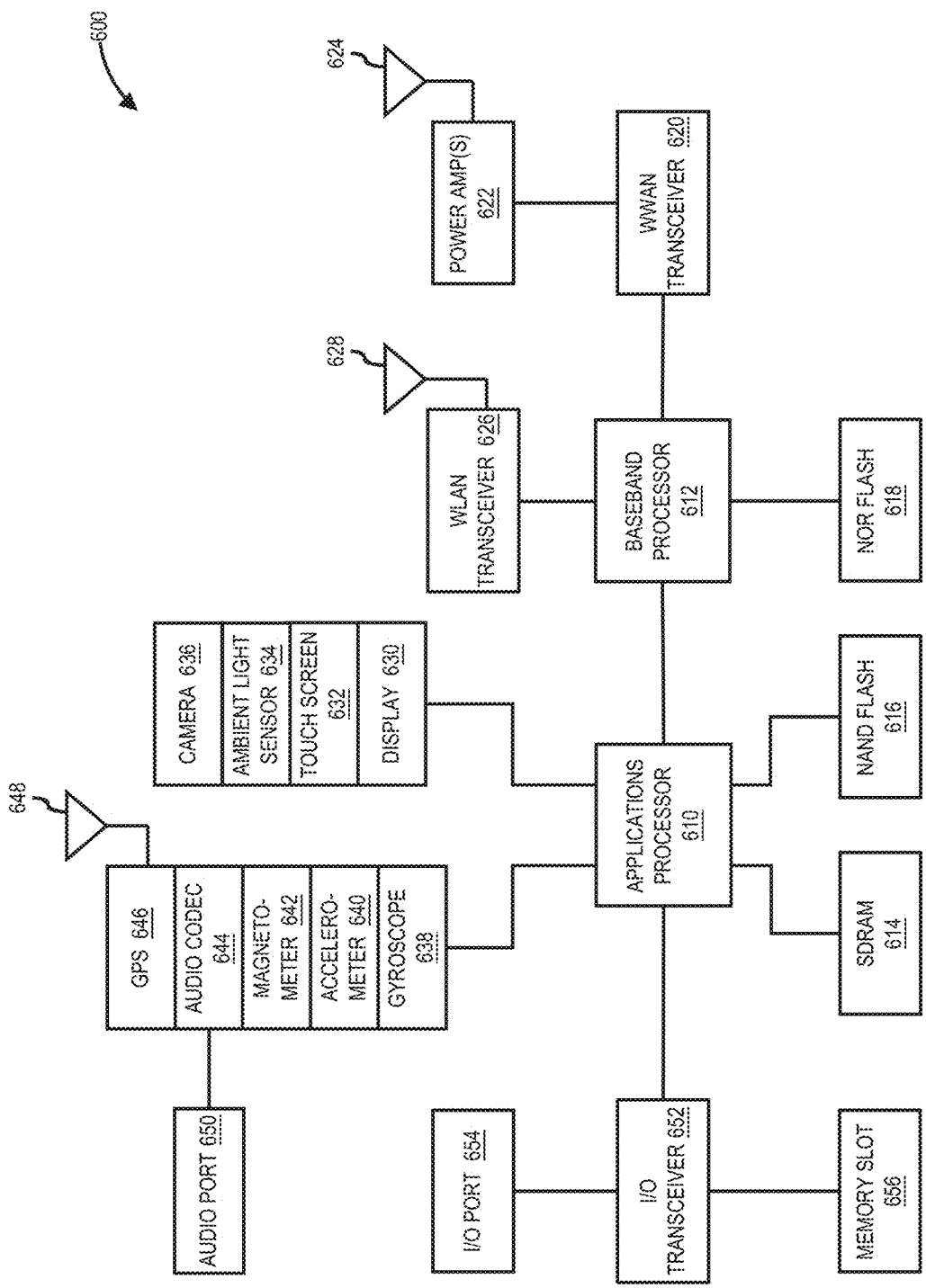
FIG. 6 is a block diagram of an information handling system capable of implementing security for paging messages in accordance with one or more embodiments.

Referring now to FIG. 6, a block diagram of an information handling system capable of implementing security for paging messages in accordance with one or more embodiments will be discussed. Although information handling system 600 represents one example of several types of computing platforms, information handling system 600 may include more or fewer elements and/or different arrangements of elements than shown in FIG. 6, and the scope of the claimed subject matter is not limited in these respects. In one embodiment, information handling system 600 may tangibly embody an apparatus of a user equipment (UE), comprising one or more baseband processors to derive a dynamic scrambling key, and a memory to store the dynamic scrambling key and a temporary UE identifier (temporary UE ID) assigned to the UE, wherein the one or more baseband processors are to monitor a paging request for a scrambled UE identifier (UE ID) to determine if the paging request is intended for the UE by unscrambling the scrambled UE ID with the dynamic scrambling key to produce the temporary UE ID. In one or more other embodiments, information handling system 600 may tangibly embody an apparatus of a Mobility Management Entity (MME), comprising one or more processors to assign a temporary user equipment (UE) identifier to a UE, and to derive a dynamic scrambling key, and a memory to store the dynamic scrambling key and a temporary UE identifier (temporary UE ID) assigned to the UE, wherein the one or more processors are to generate a scrambled UE ID derived via scrambling the temporary UE ID with the dynamic scrambling key, and to generate a paging request intended for the UE using the scrambled UE ID.

In one or more embodiments, information handling system 600 may include one or more applications processors 610 and one or more baseband processors 612. Applications processor 610 may be utilized as a general-purpose processor to run applications and the various subsystems for information handling system 600. Applications processor 610 may include a single core or alternatively may include multiple processing cores. One or more of the cores may comprise a digital signal processor or digital signal processing (DSP) core. Furthermore, applications processor 610 may include a graphics processor or coprocessor disposed on the same chip, or alternatively a graphics processor coupled to applications processor 610 may comprise a separate, discrete graphics chip. Applications processor 610 may include on board memory such as cache memory, and further may be coupled to external memory devices such as synchronous dynamic random access memory (SDRAM) 614 for storing and/or executing applications during operation, and NAND flash 316 for storing applications and/or data even when information handling system 300 is powered off. In one or more embodiments, instructions to operate or configure the information handling system 600 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 612 may control the broadband radio functions for information handling system 600. Baseband processor 612 may store code for controlling such broadband radio functions in a NOR flash 618. Baseband processor 612 controls a wireless wide area network (WWAN) transceiver 620 which is used for modulating and/or demodulating broadband network signals, for example for communicating via a 3GPP LTE or LTE-Advanced network or the like.

In general, WWAN transceiver 620 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, NR (5G), LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Evolved Universal Terrestrial Radio Access Network (E-UTRAN) NarrowBand, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mmWave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 620 couples to one or more power amps 622 respectively coupled to one or more antennas 624 for sending and receiving radio-frequency signals via the WWAN broadband network. The baseband processor 612 also may control a wireless local area network (WLAN) transceiver 626 coupled to one or more suitable antennas 628 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for applications processor 610 and baseband processor 612, and the scope of the claimed subject matter is not limited in these respects. For example, any one or more of SDRAM 614, NAND flash 616 and/or NOR flash 618 may comprise other types of memory technology such as magnetic memory, chalcogenide memory, phase change memory, or ovonic memory, and the scope of the claimed subject matter is not limited in this respect.

In one or more embodiments, applications processor 610 may drive a display 630 for displaying various information or data, and may further receive touch input from a user via a touch screen 632 for example via a finger or a stylus. An ambient light sensor 634 may be utilized to detect an amount of ambient light in which information handling system 600 is operating, for example to control a brightness or contrast value for display 630 as a function of the intensity of ambient light detected by ambient light sensor 634. One or more cameras 636 may be utilized to capture images that are processed by applications processor 610 and/or at least temporarily stored in NAND flash 616. Furthermore, applications processor may couple to a gyroscope 638, accelerometer 640, magnetometer 642, audio coder/decoder (CODEC) 644, and/or global positioning system (GPS) controller 646 coupled to an appropriate GPS antenna 648, for detection of various environmental properties including location, movement, and/or orientation of information handling system 600. Alternatively, controller 346 may comprise a Global Navigation Satellite System (GNSS) controller. Audio CODEC 644 may be coupled to one or more audio ports 650 to provide microphone input and speaker outputs either via internal devices and/or via external devices coupled to information handling system via the audio ports 650, for example via a headphone and microphone jack. In addition, applications processor 610 may couple to one or more input/output (I/O) transceivers 652 to couple to one or more I/O ports 654 such as a universal serial bus (USB) port, a high-definition multimedia interface (HDMI) port, a serial port, and so on. Furthermore, one or more of the I/O transceivers 652 may couple to one or more memory slots 656 for optional removable memory such as secure digital (SD) card or a subscriber identity module (SIM) card, although the scope of the claimed subject matter is not limited in these respects.

Figure 7:
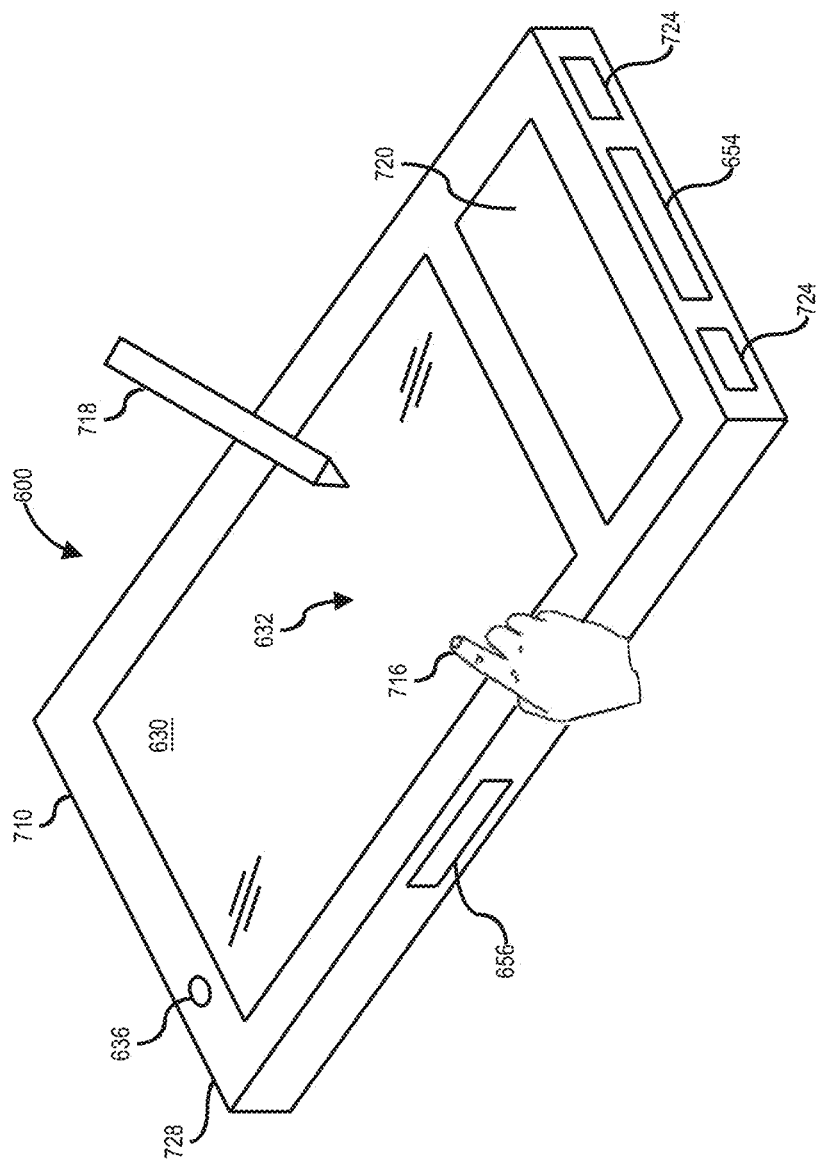
FIG. 7 is an isometric view of an information handling system of FIG. 6 that optionally may include a touch screen in accordance with one or more embodiments.

Referring now to FIG. 7, an isometric view of an information handling system of FIG. 6 that optionally may include a touch screen in accordance with one or more embodiments will be discussed. FIG. 7 shows an example implementation of information handling system 600 of FIG. 6 tangibly embodied as a cellular telephone, smartphone, or tablet type device or the like. The information handling system 600 may comprise a housing 710 having a display 630 which may include a touch screen 632 for receiving tactile input control and commands via a finger 716 of a user and/or a via stylus 718 to control one or more applications processors 710. The housing 710 may house one or more components of information handling system 600, for example one or more applications processors 610, one or more of SDRAM 614, NAND flash 616, NOR flash 618, baseband processor 612, and/or WWAN transceiver 620. The information handling system 600 further optionally may include a physical actuator area 720 which may comprise a keyboard or buttons for controlling information handling system via one or more buttons or switches. The information handling system 600 may also include a memory port or slot 656 for receiving non-volatile memory such as flash memory, for example in the form of a secure digital (SD) card or a subscriber identity module (SIM) card. Optionally, the information handling system 600 may further include one or more speakers and/or microphones 724 and a connection port 654 for connecting the information handling system 600 to another electronic device, dock, display, battery charger, and so on. In addition, information handling system 600 may include a headphone or speaker jack 728 and one or more cameras 636 on one or more sides of the housing 710. It should be noted that the information handling system 600 of FIG. 4 may include more or fewer elements than shown, in various arrangements, and the scope of the claimed subject matter is not limited in this respect.

As used herein, the terms "circuit" or "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 8:
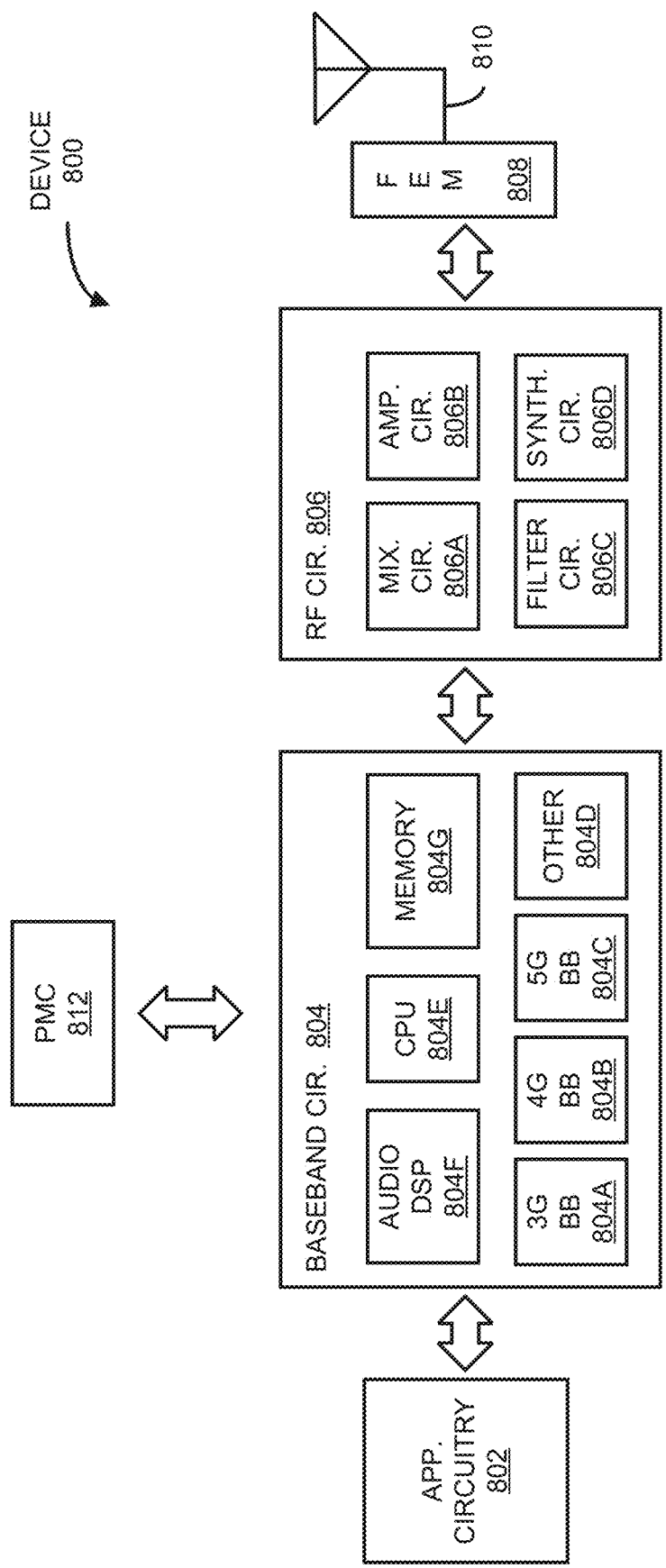
FIG. 8 illustrates example components of a device 800 in accordance with one or more embodiments.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), preceding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806*a*, amplifier circuitry 806*b* and filter circuitry 806*c*. In some embodiments, the transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*.

In some embodiments, the mixer circuitry 806*a* of the receive signal path and the mixer circuitry 806*a* of the transmit signal path may include two or more mixers and may be arranged for quadrature downconversion and upconversion, respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* may be arranged for direct downconversion and direct upconversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC XT 12 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
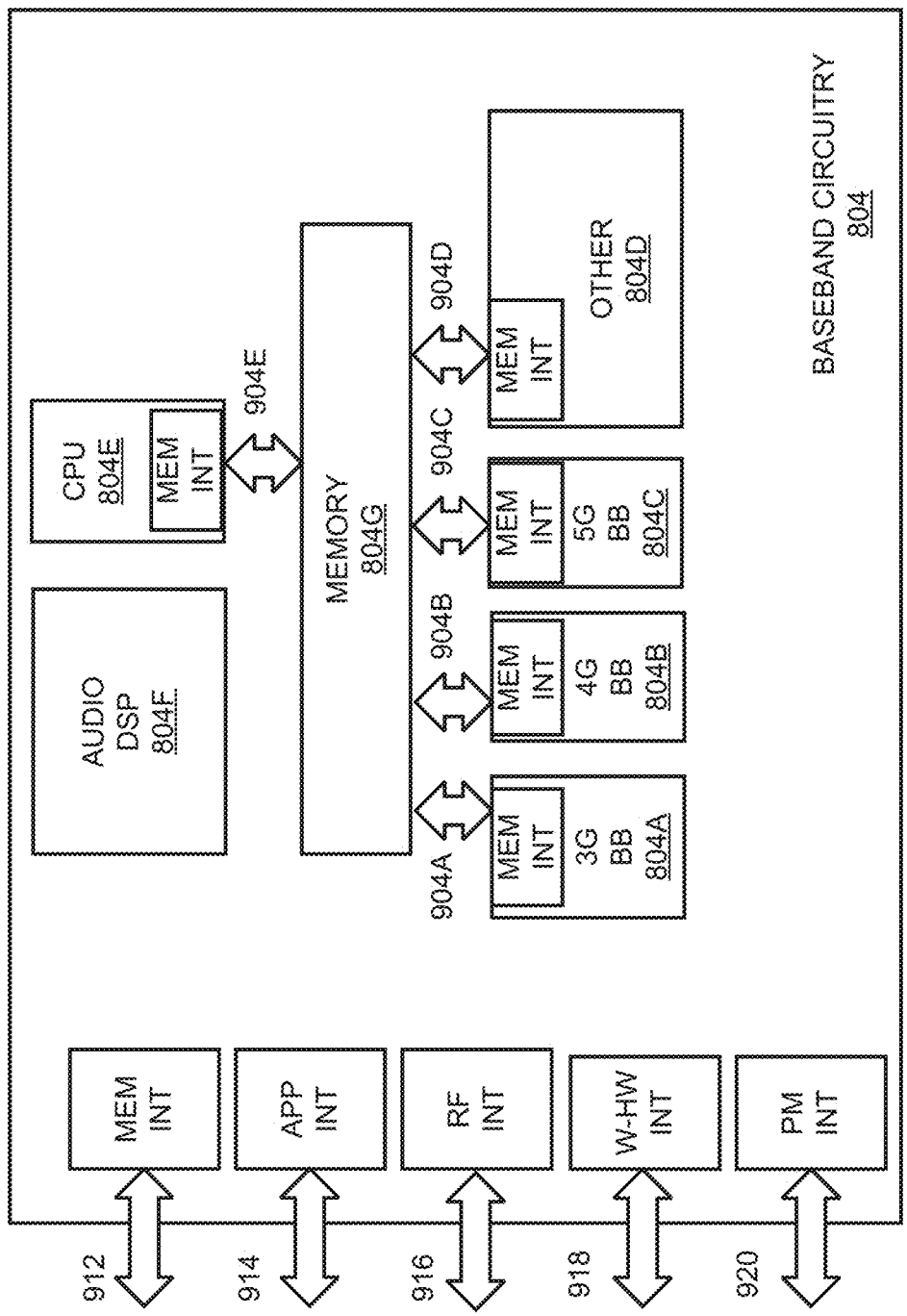
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of a user equipment (UE) comprises one or more baseband processors to derive a dynamic scrambling key, and a memory to store the dynamic scrambling key and a temporary UE identifier (temporary UE ID) assigned to the UE, wherein the one or more baseband processors are to monitor a paging request for a scrambled UE identifier (UE ID) to determine if the paging request is intended for the UE by unscrambling the scrambled UE ID with the dynamic scrambling key to produce the temporary UE ID. In example two, the apparatus may include the subject matter of example one or any of the examples described herein, wherein the one or more baseband processors are to derive a new dynamic scrambling key each time the UE returns to a radio resource control idle (RRC_IDLE) state. In example three, the apparatus may include the subject matter of example one or any of the examples described herein, wherein the one or more baseband processors are to determine that the paging request is intended for the UE if the temporary UE ID produced by unscrambling the scrambled UE ID matches the temporary UE ID stored in the memory. In example four, the apparatus may include the subject matter of example one or any of the examples described herein, wherein the scrambled UE ID was generated via an exclusive OR operation on the dynamic scrambling key and the temporary UE ID. In example five, the apparatus may include the subject matter of example one or any of the examples described herein, wherein said unscrambling comprises performing an exclusive OR (XOR) operation on the dynamic scrambling key and the scrambled UE ID. In example six, the apparatus may include the subject matter of example one or any of the examples described herein, wherein the one or more baseband processors are to determine that the paging request is intended for the UE if the scrambled UE ID matches the temporary UE ID stored in the memory. In example seven, the apparatus may include the subject matter of example one or any of the examples described herein, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI). In example eight, the apparatus may include the subject matter of example one or any of the examples described herein, wherein the dynamic scrambling key is derived from an Access Security Management Entity key ($K_{ASME}$) and an uplink non-access stratum count (UL NAS COUNT) value. In example nine, the apparatus may include the subject matter of example one or any of the examples described herein, further comprising a radio-frequency (RF) transceiver to receive the paging request from a mobility management entity (MME) via an evolved Node B (eNB).

In example ten, an apparatus of a Mobility Management Entity (MME), comprises one or more processors to assign a temporary user equipment (UE) identifier to a UE, and to derive a dynamic scrambling key, and a memory to store the dynamic scrambling key and a temporary UE identifier (temporary UE ID) assigned to the UE, wherein the one or more processors are to generate a scrambled UE ID derived via scrambling the temporary UE ID with the dynamic scrambling key, and to generate a paging request intended for the UE using the scrambled UE ID. In example eleven, the apparatus may include the subject matter of example ten or any of the examples described herein, wherein the one or more processors are to derive a new dynamic scrambling key each time the UE returns to a radio resource control idle (RRC_IDLE) state. In example twelve, the apparatus may include the subject matter of example ten or any of the examples described herein, wherein the one or more processors are to generate a paging request intended for the UE using the temporary UE ID if the UE does not respond to the paging request intended for the UE using the scrambled UE ID. In example thirteen, the apparatus may include the subject matter of example ten or any of the examples described herein, wherein the scrambled UE ID was generated via an exclusive OR (XOR) operation on the dynamic scrambling key and the temporary UE ID. In example fourteen, the apparatus may include the subject matter of example ten or any of the examples described herein, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI). In example fifteen, the apparatus may include the subject matter of example ten or any of the examples described herein, wherein the dynamic scrambling key is derived from an Access Security Management Entity key ($K_{ASME}$) and an uplink non-access stratum count (UL NAS COUNT) value. In example sixteen, the apparatus may include the subject matter of example ten or any of the examples described herein, wherein the one or more processors are to use an existing NAS security context for the UE as obtained from a previous MME if the UE is registered with the MME after performing a tracking area update to the MME. In example seventeen, the apparatus may include the subject matter of example ten or any of the examples described herein, wherein the one or more processors are to generate a new NAS security context for the UE if the UE was registered with another MME before performing a tracking area update.

In example eighteen, one or more computer readable media may have instructions stored thereon that, if executed by a user equipment (UE), result in deriving a dynamic scrambling key, storing the dynamic scrambling key and a temporary UE identifier (temporary UE ID) assigned to the UE, monitoring a paging request for a scrambled UE identifier (UE ID); and determining if the paging request is intended for the UE by unscrambling the scrambled UE ID with the dynamic scrambling key to produce the temporary UE ID. In example nineteen, the instructions may include the subject matter of example eighteen or any of the examples described herein, wherein the instructions, if executed, further result in deriving a new dynamic scrambling key each time the UE returns to a radio resource control idle (RRC_IDLE) state. In example twenty, the instructions may include the subject matter of example eighteen or any of the examples described herein, wherein the instructions, if executed, further result in determining that the paging request is intended for the UE if the temporary UE ID produced by unscrambling the scrambled UE ID matches the temporary UE ID stored in the memory. In example twenty-one, the instructions may include the subject matter of example eighteen or any of the examples described herein, wherein the scrambled UE ID was generated via an exclusive OR operation on the dynamic scrambling key and the temporary UE ID. In example twenty-two, the instructions may include the subject matter of example eighteen or any of the examples described herein, wherein said unscrambling comprises performing an exclusive OR (XOR) operation on the dynamic scrambling key and the scrambled UE ID. In example twenty-three, the instructions may include the subject matter of example eighteen or any of the examples described herein, wherein the instructions, if executed, further result in determining that the paging request is intended for the UE if the scrambled UE ID matches the temporary UE ID stored in the memory. In example twenty-four, the instructions may include the subject matter of example eighteen or any of the examples described herein, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI). In example twenty-five, the instructions may include the subject matter of example eighteen or any of the examples described herein, wherein the dynamic scrambling key is derived from an Access Security Management Entity key ($K_{ASME}$) and an uplink non-access stratum count (UL NAS COUNT) value.

In example twenty-six, one or more computer readable media may have instructions stored thereon that, if executed by a mobility management entity (MME), result in assigning a temporary user equipment (UE) identifier to a UE, deriving a dynamic scrambling key, storing the dynamic scrambling key and a temporary UE identifier (temporary UE ID) assigned to the UE, generating a scrambled UE ID derived via scrambling the temporary UE ID with the dynamic scrambling key, and generating a paging request intended for the UE using the scrambled UE ID. In example twenty-seven, the instructions may include the subject matter of example twenty-six or any of the examples described herein, wherein the instructions, if executed, further result in deriving a new dynamic scrambling key each time the UE returns to a radio resource control idle (RRC_IDLE) state. In example twenty-eight, the instructions may include the subject matter of example twenty-six or any of the examples described herein, wherein the instructions, if executed, further result in generating a paging request intended for the UE using the temporary UE ID if the UE does not respond to the paging request intended for the UE using the scrambled UE ID. In example twenty-nine, the instructions may include the subject matter of example twenty-six or any of the examples described herein, wherein the scrambled UE ID is generated via an exclusive OR (XOR) operation on the dynamic scrambling key and the temporary UE ID. In example thirty, the instructions may include the subject matter of example twenty-six or any of the examples described herein, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI). In example thirty-one, the instructions may include the subject matter of example twenty-six or any of the examples described herein, wherein the dynamic scrambling key is derived from an Access Security Management Entity key ($K_{ASME}$) and an uplink non-access stratum count (UL NAS COUNT) value. In example thirty-two, the instructions may include the subject matter of example twenty-six or any of the examples described herein, wherein the instructions, if executed, further result in using an existing NAS security context for the UE as obtained from a previous MME if the UE is registered with the MME after performing a tracking area update to the MME. In example thirty-three the instructions may include the subject matter of example twenty-six or any of the examples described herein, wherein the instructions, if executed, further result in generating a new NAS security context for the UE if the UE was registered with another MME before performing a tracking area update.

In example thirty-four, an apparatus of a user equipment (UE), comprises means for deriving a dynamic scrambling key, means for storing the dynamic scrambling key and a temporary UE identifier (temporary UE ID) assigned to the UE, means for monitoring a paging request for a scrambled UE identifier (UE ID), and means for determining if the paging request is intended for the UE by unscrambling the scrambled UE ID with the dynamic scrambling key to produce the temporary UE ID. In example thirty-five, the apparatus may include the subject matter of example thirty-four or any of the examples described herein, further comprising means for deriving a new dynamic scrambling key each time the UE returns to a radio resource control idle (RRC_IDLE) state. In example thirty-six, the apparatus may include the subject matter of example thirty-four or any of the examples described herein, further comprising means for determining that the paging request is intended for the UE if the temporary UE ID produced by unscrambling the scrambled UE ID matches the temporary UE ID stored in the memory. In example thirty-seven, the apparatus may include the subject matter of example thirty-four or any of the examples described herein, wherein the scrambled UE ID was generated via an exclusive OR operation on the dynamic scrambling key and the temporary UE ID. In example thirty-eight, the apparatus may include the subject matter of example thirty-four or any of the examples described herein, further comprising means for performing an exclusive OR (XOR) operation on the dynamic scrambling key and the scrambled UE ID. In example thirty-nine, the apparatus may include the subject matter of example thirty-four or any of the examples described herein, further comprising means for determining that the paging request is intended for the UE if the scrambled UE ID matches the temporary UE ID stored in the memory. In example forty, the apparatus may include the subject matter of example thirty-four or any of the examples described herein, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI). In example forty-one, the apparatus may include the subject matter of example thirty-four or any of the examples described herein, wherein the dynamic scrambling key is derived from an Access Security Management Entity key ($K_{ASME}$) and an uplink non-access stratum count (UL NAS COUNT) value.

In example forty-two, an apparatus of a mobility management entity (MME), comprises means for assigning a temporary user equipment (UE) identifier to a UE, means for deriving a dynamic scrambling key, means for storing the dynamic scrambling key and a temporary UE identifier (temporary UE ID) assigned to the UE, means for generating a scrambled UE ID derived via scrambling the temporary UE ID with the dynamic scrambling key, and means for generating a paging request intended for the UE using the scrambled UE ID. In example forty-three, the apparatus may include the subject matter of example forty-two or any of the examples described herein, wherein the instructions, if executed, further result in deriving a new dynamic scrambling key each time the UE returns to a radio resource control idle (RRC_IDLE) state. In example forty-four, the apparatus may include the subject matter of example forty-two or any of the examples described herein, further comprising means for generating a paging request intended for the UE using the temporary UE ID if the UE does not respond to the paging request intended for the UE using the scrambled UE ID. In example forty-five, the apparatus may include the subject matter of example forty-two or any of the examples described herein, wherein the scrambled UE ID is generated via an exclusive OR (XOR) operation on the dynamic scrambling key and the temporary UE ID. In example forty-six, the apparatus may include the subject matter of example forty-two or any of the examples described herein, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI). In example forty-seven, the apparatus may include the subject matter of example forty-two or any of the examples described herein, wherein the dynamic scrambling key is derived from an Access Security Management Entity key ($K_{ASME}$) and an uplink non-access stratum count (UL NAS COUNT) value. In example forty-eight, the apparatus may include the subject matter of example forty-two or any of the examples described herein, further comprising means for using an existing NAS security context for the UE as obtained from a previous MME if the UE is registered with the MME after performing a tracking area update to the MME. In example forty-nine, the apparatus may include the subject matter of example forty-two or any of the examples described herein, further comprising means for generating a new NAS security context for the UE if the UE was registered with another MME before performing a tracking area update. In example fifty, machine-readable storage includes machine-readable instructions, when executed, to realize an apparatus as claimed in any preceding claim.

In the description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the description and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to security for paging messages and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
one or more baseband processors to derive a dynamic scrambling key in response to the UE releasing a radio resource control (RRC) connection and determine whether a non-access stratum (NAS) security mode control procedure is performed during the RRC connection, wherein, when the NAS security mode control procedure is performed during the RRC connection, the dynamic scrambling key is derived based on at least a cell identity and a NAS count value used to track a security mode complete message for the NAS security mode control procedure and, when the NAS security mode control procedure is not performed during the RRC connection, the dynamic scrambling key is derived based on at least the cell identity and a NAS count value used to track an initial uplink NAS message for RRC connection establishment; and
a memory to store the dynamic scrambling key and a temporary UE identifier (temporary UE ID) assigned to the UE;
wherein the one or more baseband processors are to monitor a paging request for a scrambled LIE identifier (UE ID) to determine if the paging request is intended for the UE by unscrambling the scrambled UE ID with the dynamic scrambling key to produce the temporary UE ID.

2. The apparatus of claim 1, wherein the one or more baseband processors are to derive a new dynamic scrambling key each time the UE returns to a radio resource control idle (RRC_IDLE) state.

3. The apparatus of claim 1, wherein the one or more baseband processors are to determine that the paging request is intended for the UE if the temporary UE ID produced by unscrambling the scrambled UE ID matches the temporary UE ID stored in the memory.

4. The apparatus of claim 1, wherein the scrambled UE ID was generated via an exclusive OR operation on the dynamic scrambling key and the temporary UE ID.

5. The apparatus of claim 1, wherein said unscrambling comprises performing an exclusive OR (XOR) operation on the dynamic scrambling key and the scrambled UE ID.

6. The apparatus of claim 1, wherein the one or more baseband processors are to determine that the paging request is intended for the UE if the scrambled UE ID matches the temporary UE ID stored in the memory.

7. The apparatus of claim 1, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI).

8. The apparatus of claim 1, wherein the dynamic scrambling key is further based on an Access Security Management Entity key ($K_{ASME}$).

9. The apparatus of claim 1, further comprising a radio-frequency (RF) transceiver to receive the paging request from a mobility management entity (MME) via an evolved Node B (eNB).

10. An apparatus of a Mobility Management Entity (MME), comprising:
one or more processors to assign a temporary user equipment (UE) identifier to a UE, derive a dynamic scrambling key in response to the UE releasing a radio resource control (RRC) connection and determine whether a non-access stratum (NAS) security mode control procedure is performed by the UE during the RRC connection, wherein, when the NAS security mode control procedure is performed during the RRC connection, the dynamic scrambling key is derived based on at least a cell identity and a NAS count value used to track a security mode complete message for the NAS security mode control procedure and, when the NAS security mode control procedure is not performed during the RRC connection, the dynamic scrambling key is derived based on at least the cell identity and a NAS count value used to track an initial uplink NAS message for RRC connection establishment; and
a memory to store the dynamic scrambling key and a temporary UE identifier (temporary UE ID) assigned to the UE;
wherein the one or more processors are to generate a scrambled UE ID derived via scrambling the temporary UE ID with the dynamic scrambling key, and to generate a paging request intended for the UE using the scrambled UE ID.

11. The apparatus of claim 10, wherein the one or more processors are to derive a new dynamic scrambling key each time the UE returns to a radio resource control idle (RRC_IDLE) state.

12. The apparatus of claim 10, wherein the one or more processors are to generate a paging request intended for the UE using the temporary UE ID if the UE does not respond to the paging request intended for the UE using the scrambled UE ID.

13. The apparatus of claim 10, wherein the scrambled UE ID was generated via an exclusive OR (XOR) operation on the dynamic scrambling key and the temporary UE ID.

14. The apparatus of claim 10, wherein the temporary UE ID comprises a Globally Unique Temporary Identity (GUTI), a System Architecture Evolution (SAE) Temporary Mobile Subscriber Identity (S-TMSI), or a Mobility Management Entity (MME) TMSI (M-TMSI).

15. The apparatus of claim 10, wherein the dynamic scrambling key is further based on an Access Security Management Entity key ($K_{ASME}$).

16. The apparatus of claim 10, wherein the one or more processors are to use an existing NAS security context for the UE as obtained from a previous MME if the UE is registered with the MME after performing a tracking area update to the MME.

17. The apparatus of claim 10, wherein the one or more processors are to generate a new NAS security context for the UE if the UE was registered with another MME before performing a tracking area update.

18. One or more non-transitory computer readable media having instructions stored thereon that, if executed by a user equipment (UE), result in:
deriving a dynamic scrambling key in response to the UE releasing a radio resource control (RRC) connection;
determining whether a non-access stratum (NAS) security mode control procedure is performed during the RRC connection, wherein, when the NAS security mode control procedure is performed during the RRC connection, the dynamic scrambling key is derived based on at least a cell identity and a NAS count value used to track a security mode complete message for the NAS security mode control procedure and, when the NAS security mode control procedure is not performed during the RRC connection, the dynamic scrambling key is derived based on at least the cell identity and a NAS count value used to track an initial uplink NAS message for RRC connection establishment;

storing the dynamic scrambling key and a temporary UE identifier (temporary UE ID) assigned to the UE;

monitoring a paging request for a scrambled UE identifier (UE ID); and determining if the paging request is intended for the UE by unscrambling the scrambled UE ID with the dynamic scrambling key to produce the temporary UE.

19. The one or more non-transitory computer readable media of claim 18, wherein the instructions, if executed, further result in deriving a new dynamic scrambling key each time the UE returns to a radio resource control idle (RRC_IDLE) state.

20. The one or more non-transitory computer readable media of claim 18, wherein the instructions, if executed, further result in determining that the paging request is intended for the UE if the temporary UE ID produced by unscrambling the scrambled UE ID matches the temporary UE ID stored in the memory.

\* \* \* \* \*